United States Patent
Sorenson, III et al.

(10) Patent No.: US 12,487,983 B2
(45) Date of Patent: *Dec. 2, 2025

(54) TIME AND VALUE ORDERED DATA OBJECTS FOR A BACKUP OF A DATA SET

(71) Applicant: Amazon Technologies, Inc., Seattle, WA (US)

(72) Inventors: James Christopher Sorenson, III, Madison, WI (US); Hao He, Bellevue, WA (US); Nicholas Gordon, Seattle, WA (US); Mrithyunjaya Kumar Annapragada, Concord, MA (US)

(73) Assignee: Amazon Technologies, Inc., Seattle, WA (US)

( * ) Notice: Subject to any disclaimer, the term of this patent is extended or adjusted under 35 U.S.C. 154(b) by 12 days.

This patent is subject to a terminal disclaimer.

(21) Appl. No.: 18/439,526

(22) Filed: Feb. 12, 2024

(65) Prior Publication Data

US 2024/0202181 A1    Jun. 20, 2024

Related U.S. Application Data

(63) Continuation of application No. 18/067,692, filed on Dec. 16, 2022, now Pat. No. 11,928,099.

(51) Int. Cl.
*G06F 16/20* (2019.01)
*G06F 11/14* (2006.01)
(Continued)

(52) U.S. Cl.
CPC ...... *G06F 16/2358* (2019.01); *G06F 11/1451* (2013.01); *G06F 16/219* (2019.01);
(Continued)

(58) Field of Classification Search
CPC .. G06F 16/113; G06F 16/219; G06F 16/2282; G06F 16/2358; G06F 16/2365;
(Continued)

(56) References Cited

U.S. PATENT DOCUMENTS 8,498,995 B1   7/2013  Gond et al.
8,817,541 B2   8/2014  Li et al.
(Continued)

FOREIGN PATENT DOCUMENTS

WO    2021037684         3/2021
WO    WO-2022098725 A1 * 5/2022 .......... G06F 11/1451

OTHER PUBLICATIONS

International Search Report and Written Opinion from PCT/US2023/083517, dated Apr. 19, 2024, pp. 1-11.
(Continued)

*Primary Examiner* — Diedra McQuitery
(74) *Attorney, Agent, or Firm* — S. Scott Foster; Kowert, Hood, Munyon, Rankin & Goetzel, P.C.

(57) ABSTRACT

Time and value ordering may be applied for items stored in data backups. A change log that persists changes to a data set may be updated with changes and used to update an in-memory table for the data set, which describes changes to items up to a current time. An event may be detected to seal the in-memory table from subsequent updates and a persistent data object that orders the items in the in-memory according to both keys of the respective items and the respective time values of the items, as stored in the change log, may be generated and stored as part of a backup for the data set.

20 Claims, 7 Drawing Sheets

(51) Int. Cl.
*G06F 16/21* (2019.01)
*G06F 16/23* (2019.01)
*G06F 21/60* (2013.01)
*G06F 16/11* (2019.01)

(52) U.S. Cl.
CPC ........ G06F 16/2365 (2019.01); G06F 21/602 (2013.01); *G06F 16/113* (2019.01); *G06F 2201/84* (2013.01)

(58) Field of Classification Search
CPC ............. G06F 11/1451; G06F 11/1464; G06F 11/1471; G06F 11/1474; G06F 21/602; G06F 2201/84
See application file for complete search history.

(56) References Cited

U.S. PATENT DOCUMENTS

| | | | |
|---|---|---|---|
| 8,849,825 | B1 | 9/2014 | Mchugh |
| 8,972,337 | B1 | 3/2015 | Gupta |
| 9,842,132 | B2 | 12/2017 | McKenna et al. |
| 9,953,102 | B2 | 4/2018 | Zhou et al. |
| 10,133,767 | B1 | 11/2018 | Cole |
| 10,649,980 | B2 | 5/2020 | Newman |
| 11,928,099 | B1 | 3/2024 | Sorenson, III et al. |
| 2003/0163439 | A1 | 8/2003 | Hankin et al. |
| 2005/0283567 | A1 | 12/2005 | Popescu-Stanesti et al. |
| 2006/0271784 | A1 | 11/2006 | Bolosky et al. |
| 2010/0306222 | A1 | 12/2010 | Freedman et al. |
| 2011/0307736 | A1* | 12/2011 | George ................ G06F 3/0685 714/6.2 |
| 2014/0082316 | A1 | 3/2014 | Erdmann |
| 2015/0268878 | A1 | 9/2015 | Amit et al. |
| 2015/0370644 | A1 | 12/2015 | Graefe |
| 2016/0085473 | A1 | 3/2016 | Hershey et al. |
| 2018/0253468 | A1 | 9/2018 | Gurajada et al. |
| 2019/0097971 | A1 | 3/2019 | Coleman et al. |
| 2020/0125660 | A1 | 4/2020 | Shuma |
| 2022/0229732 | A1* | 7/2022 | Chitloor .............. G06F 11/1451 |
| 2022/0269570 | A1 | 8/2022 | Agarwal et al. |

OTHER PUBLICATIONS

U.S. Appl. No. 18/067,684, filed Dec. 16, 2022, James Christopher Sorenson, III.

* cited by examiner

TIME AND VALUE ORDERED DATA OBJECTS FOR A BACKUP OF A DATA SET

PRIORITY APPLICATION

This application is a continuation of U.S. patent application Ser. No. 18/067,692, filed Dec. 16, 2022, which is hereby incorporated by reference herein in its entirety.

BACKGROUND

Commoditization of computer hardware and software components has led to the rise of service providers that provide computational and storage capacity as a service. At least some of these services (e.g., managed services such as managed relational database services) can be difficult to scale, including scaling the processing capacity. Disruption of an application or other process can be a high cost associated with changing capacity to better match workloads, as client applications may be interrupted due to dropped connections (and may not even retry to connect, in some instances). Techniques that can increase capacity of resources to match workloads therefore are highly desirable.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The techniques described herein may implement time and value ordered data objects for a backup of a data set. Different types of workloads can take advantage of different types of techniques for increasing the capacity of a database to handle the types of workloads. For read workloads, for instance, the number of copies of data that can be read may be increased, supporting parallel access to the different copies of data and thus increasing the number of read requests that can be performed at any given time. Write workloads, however, may incur many different operations (including multiple write operations) in order to consistently perform writes (and replicate the changes to other copies). Time and value data objects for a backup of a data set may provide, in various embodiments, faster performance for write workloads as a backup for the database that can be efficiently updated using persistent data objects while minimizing the number write operations to be performed in order to perform a write consistently (and across a number of copies).

Figure 1:
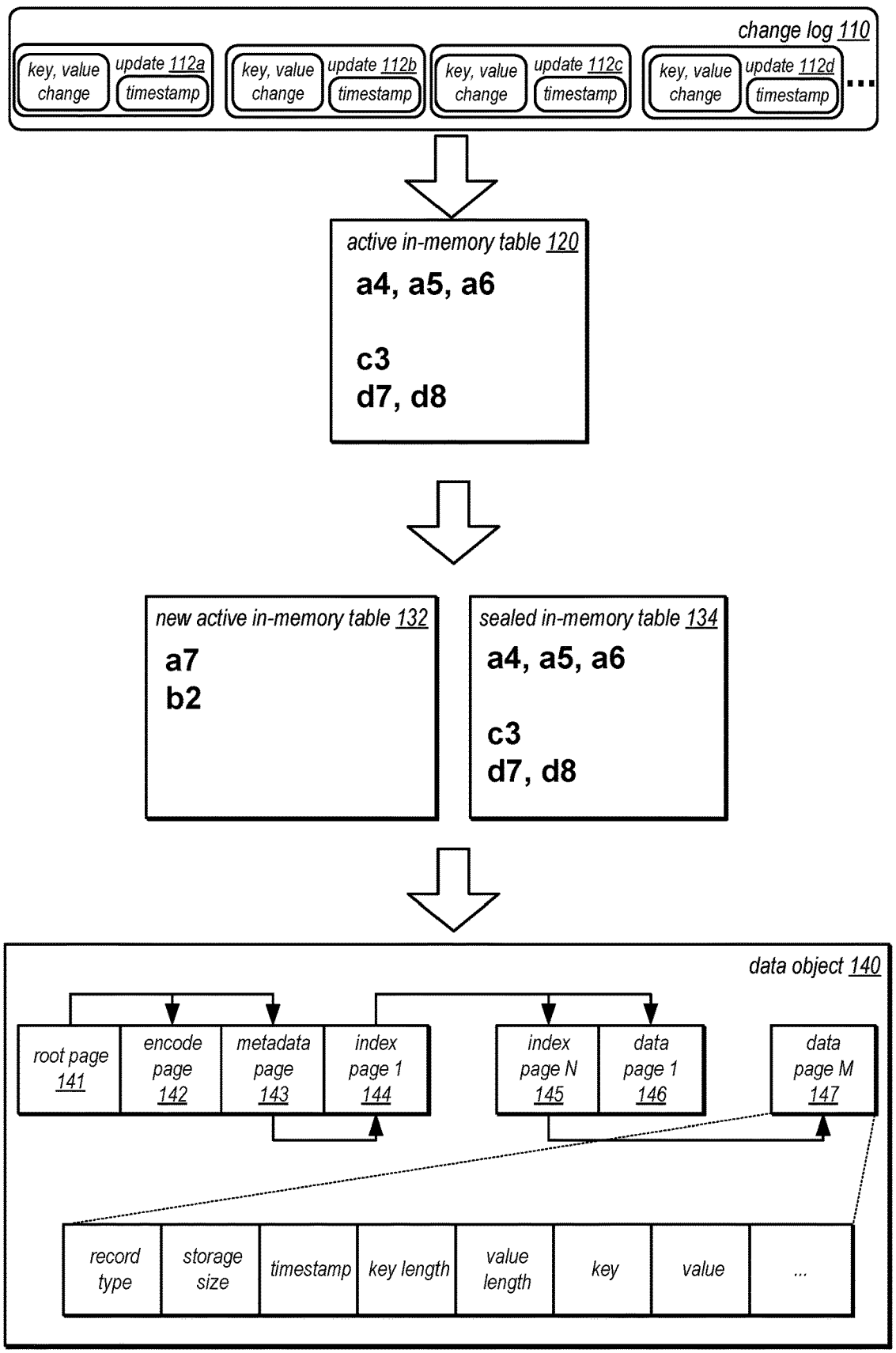
FIG. 1 is a logical block diagram illustrating time and value ordered data objects for a backup of a data set, according to some embodiments.

FIG. 1 is a logical block diagram illustrating time and value ordered data objects for a backup of a data set, according to some embodiments. A data set, such as a database (e.g., relational, non-relational, time series, and various other types of database) or other collection of data items, may be stored in a format in data objects (e.g., files or other data structures) in storage to provide persistent storage (e.g., a backup copy) of the data set, which may be accessed for various operations. When changes to the data set are received, the may be recorded (and in some embodiments persisted) in a change log, such as change log 110.

Items in a data set may include various features, attributes, columns, records, or values according to the type of data set. In some embodiments, a data set may store items that contain one or more key-value pairs. A key may store an identifier used to lookup the value paired with the key. Change log 110 may include various updates that describe received changes, such as updates 112a, 112b, 112c, and 112d, which include respective keys (or other item value identifier), changes to the value paired with the key (modifications of the value, insertions of the key and value, or removal of the key and value), and assigned time values (e.g., timestamps). Multiple versions of the same item (e.g., with the same key), may be included in change log 110 as each update 112 may represent a change to that item over time (e.g., corresponding to different timestamps).

In addition to change log 110, an active in-memory table 120 may be maintained (e.g., at a node, system, or other component that performs reads and/or writes to the data set), such as a primary storage node as discussed below with regard to FIG. 3. Active in-memory table 120 may be updated in accordance with change log 110, obtaining new updates and including the different updates in the active-in-memory table 120. For example, the "a" item (e.g., key "a") may have the value of key "a" change over time, and thus may have different values at different timestamps. Thus active in-memory table 120 may store the different versions of the key over time (e.g., a4, a5, a6, c3, d7, and d8).

In some embodiments, a trigger event or other condition may cause the active in-memory table to be sealed (e.g., no longer able to be written) or otherwise made immutable to further updates. Meanwhile, new changes to the data set stored in change log 110 may be written to new active in-memory table 132, such as a modification to key a, recorded as "a7" and to key "b" as "b2". Sealed in-memory table 124 may thus preserve the items, including key value pairs and respective time stamps. While new changes to the data set stored in change log 110 may be written to new active in-memory table 132.

To preserve the data from sealed in-memory table 134, a new data object 140 (e.g., a file or other data storage unit, collection, or object) may store the items of sealed in-memory table 134 in key value and time ordering (e.g., a1, then a2, then a3, and so on). Data object 140 may implement root page 141 which identifies locations of encode page 142 (e.g., indicating the presence and type of encryption and/or compression of data object 140 for one or more index and/or data pages and, which may also allow for different encryption and/or compression techniques to be applied to the pages), metadata page 143 containing metadata about the data object 140, index pages 144 through 145 (e.g., b-tree or other index structure pages) which organize the items to be sorted in key value and time order, and data pages 146 through 147, which may include the items (e.g., record type, storage size, timestamp, key length, key value pair and among other possible information). An example layout of a data page is illustrated, including fields of record type, storage size, timestamp, key length, key, value, cyclic redundancy check (CRC) value(s) and so on). In some embodiments, a key and values may be stored as an array of byte arrays. In some embodiments, multiple data objects, including new data object 140 may be stored together to make up a backup of the data set (e.g., of a partition of a database). For example, each of the multiple data objects may together implement a log-structured merge tree (sometimes referred to as an LSM tree).

Please note that previous descriptions of a change log, in-memory tables, and data object are not intended to be limiting, but are merely provided as logical examples.

This specification begins with a general description of a provider network that may implement a database service that may implement time and value ordered data objects for a backup of a data set. Then various examples of a database service are discussed, including different components/modules, or arrangements of components/module, that may be employed as part of implementing the database service, in some embodiments. A number of different methods and techniques to implement time and value ordered data objects for a backup of a data set are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
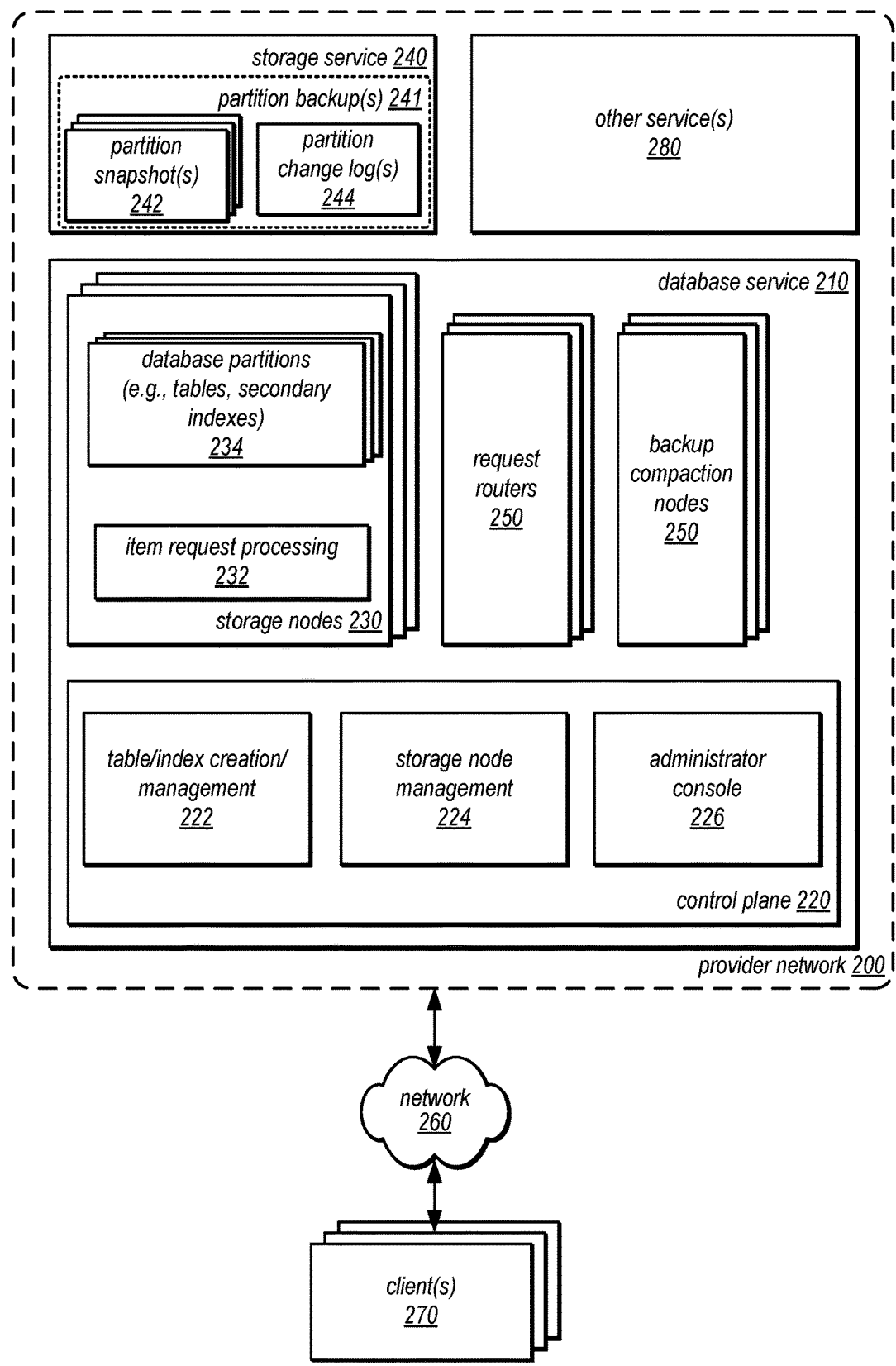
FIG. 2 is a logical block diagram illustrating a provider network offering a database service that may implement time and value ordered data objects for a backup of a data set, according to some embodiments.

FIG. 2 is a logical block diagram illustrating a provider network offering a database service that may implement time and value ordered data objects for a backup of a data set, according to some embodiments. Provider network 200 may be a private or closed system, in some embodiments, or may be set up by an entity such as a company or a public sector organization to provide one or more services (such as various types of cloud-based storage) accessible via the Internet and/or other networks to clients 270, in another embodiment. In some embodiments, provider network 200 may be implemented in a single location or may include numerous data centers hosting various resource pools, such as collections of physical and/or virtualized computer servers, storage devices, networking equipment and the like (e.g., computing system 1000 described below with regard to FIG. 7), needed to implement and distribute the infrastructure and storage services offered by the provider network 200. In some embodiments, provider network 200 may implement various computing resources or services, such as database service 210 (e.g., a non-relational (NoSQL) database, relational database service or other database service that may utilize collections of items (e.g., tables that include items)), and other services (not illustrated), such as data flow processing service, and/or other large scale data processing techniques), data storage services (e.g., an object storage service, block-based storage service, or data storage service that may store different types of data for centralized access), virtual compute services, and/or any other type of network-based services (which may include various other types of storage, processing, analysis, communication, event handling, visualization, and security services).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), in some embodiments, each of which may be similar to the computer system embodiment illustrated in FIG. 7 and described below. In some embodiments, the functionality of a given system or service component (e.g., a component of database service 210) may be implemented by a particular node or may be distributed across several nodes. In some embodiments, a given node may implement the functionality of more than one service system component (e.g., more than one data store component).

Database service 210 may implement various types of distributed database services, in some embodiments, for storing, accessing, and updating data in tables hosted in a database. Such services may be enterprise-class database systems that are highly scalable and extensible. In some embodiments, access requests (e.g., requests to get/obtain items, put/insert items, delete items, update or modify items, scan multiple items) may be directed to a table in database service 210 that is distributed across multiple physical resources, and the database system may be scaled up or down on an as needed basis. In some embodiments, clients/subscribers may submit requests in a number of ways, e.g., interactively via graphical user interface (e.g., a console) or a programmatic interface to the database system. In some embodiments, database service 210 may provide a RESTful programmatic interface in order to submit access requests (e.g., to get, insert, delete, or scan data). In some embodiments, a query language (e.g., Structured Query Language (SQL)) may be used to specify access requests.

In some embodiments, clients 270 may encompass any type of client configurable to submit network-based requests to provider network 200 via network 260, including requests for database service 210 (e.g., to access item(s) in a table or secondary index in database service 210). For example, in some embodiments a given client 270 may include a suitable version of a web browser, or may include a plug-in module or other type of code module that executes as an extension to or within an execution environment provided by a web browser. Alternatively in a different embodiment, a client 270 may encompass an application such as a database client/application (or user interface thereof), a media application, an office application or any other application that may make use of a database in database service 210 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 270 may be an application that interacts directly with provider network 200, in some embodiments. In some embodiments, client 270 may generate network-based services requests according to a Representational State Transfer (REST)-style network-based services architecture, a document- or message-based network-based services architecture, or another suitable network-based services architecture. Note that in some embodiments, clients of database service 210 may be implemented within provider network 200 (e.g., applications hosted on a virtual compute service).

In some embodiments, clients of database service 210 may be implemented on resources within provider network 200 (not illustrated). For example, a client application may be hosted on a virtual machine or other computing resources implemented as part of another provider network service that may send access requests to database service 210 via an internal network (not illustrated).

In some embodiments, a client 270 may provide access to provider network 200 to other applications in a manner that is transparent to those applications. For example, client 270 may integrate with a database on database service 210. In such an embodiment, applications may not need to be modified to make use of a service model that utilizes database service 210. Instead, the details of interfacing to the database service 210 may be coordinated by client 270.

Client(s) 270 may convey network-based services requests to and receive responses from provider network 200 via network 260, in some embodiments. In some embodiments, network 260 may encompass any suitable combination of networking hardware and protocols necessary to establish network-based-based communications between clients 270 and provider network 200. For example, network 260 may encompass the various telecommunications networks and service providers that collectively implement the Internet. In some embodiments, network 260 may also include private networks such as local area networks (LANs) or wide area networks (WANs) as well as public or private wireless networks. For example, both a given client 270 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client(s) 270 and the Internet as well as between the Internet and provider network 200. It is noted that in some embodiments, client(s) 270 may communicate with provider network 200 using a private network rather than the public Internet.

Database service 210 may implement request routers 250, in some embodiments. Request routers 250 may receive and parse client access requests, in various embodiments in order to determine various features of the request, to parse, authenticate, throttle and/or dispatch access requests, among other things, in some embodiments. Database service 210 may implement backup compaction nodes 250, which may perform compaction techniques including the generation of new data objects and merged data objects, as discussed in detail below with regard to FIGS. 3 and 4.

In some embodiments, database service 210 may implement control plane 220 to implement one or more administrative components, such as automated admin instances or nodes (which may provide a variety of visibility and/or control functions). In various embodiments, control plane 220 may direct the performance of different types of control plane operations among the nodes, systems, or devices implementing database service 210, in some embodiments. Control plane 220 may provide visibility and control to system administrators via administrator console 226, in some embodiment. Administrator console 226 may allow system administrators to interact directly with database service 210 (and/or the underlying system). In some embodiments, the administrator console 226 may be the primary point of visibility and control for database service 210 (e.g., for configuration or reconfiguration by system administrators). For example, the administrator console may be implemented as a relatively thin client that provides display and control functionally to system administrators and/or other privileged users, and through which system status indicators, metadata, and/or operating parameters may be observed and/or updated. Control plane 220 may provide an interface or access to information stored about one or more detected control plane events, such as data backup or other management operations for a table, at database service 210, in some embodiments.

Storage node management 224 may provide resource allocation, in some embodiments, for storing additional data in table submitted to database service 210. For instance, control plane 220 may communicate with storage nodes 230 to initiate the performance of various control plane operations, such as moves of table partitions, merges of table partitions, splits of table partitions, update tables, delete tables, create secondary indexes, etc . . . . In some embodiments, control plane 220 may include a node recovery feature or component that handles failure events for storage nodes 230, propagation architectures 290 and request routers 250 (e.g., adding new nodes, removing failing or underperforming nodes, deactivating or decommissioning underutilized nodes, etc).

Various durability, resiliency, control, or other operations may be directed by control plane 220. For example, storage node management 224 may detect merge, split, copy, or move events for partitions at storage nodes in order to ensure that the storage nodes maintain satisfy a minimum performance level for performing access requests. For instance, in various embodiments, there may be situations in which a partition (or a replica thereof) may need to be copied, e.g., from one storage node to another. For example, if there are three replicas of a particular partition, each hosted on a different physical or logical machine, and one of the machines fails, the replica hosted on that machine may need to be replaced by a new copy of the partition on another machine. In another example, if a particular machine that hosts multiple partitions of one or more tables experiences heavy traffic, one of the heavily accessed partitions may be moved (using a copy operation) to a machine that is experiencing less traffic in an attempt to more evenly distribute the system workload and improve performance. In some embodiments, storage node management 224 may perform partition moves using a physical copying mechanism (e.g., a physical file system mechanism, such as a file copy mechanism) that copies an entire partition from one machine to another, rather than copying a snapshot of the partition data row by. While the partition is being copied, write operations targeting the partition may be logged. During the copy operation, any logged write operations may be applied to the partition by a catch-up process at periodic intervals (e.g., at a series of checkpoints). Once the entire partition has been copied to the destination machine, any remaining logged write operations (i.e. any write operations performed since the last checkpoint) may be performed on the destination partition by a final catch-up process. Therefore, the data in the destination partition may be consistent following the completion of the partition move, in some embodiments. In this way, storage node management 224 can move partitions amongst storage nodes 230 while the partitions being moved are still "live" and able to accept access requests.

In some embodiments, the partition moving process described above may be employed in partition splitting operations by storage node management 224 in response to the detection of a partition split event. For example, a partition may be split because it is large, e.g., when it becomes too big to fit on one machine or storage device and/or in order to keep the partition size small enough to quickly rebuild the partitions hosted on a single machine (using a large number of parallel processes) in the event of a machine failure. A partition may also be split when it becomes too "hot" (i.e. when it experiences a much greater than average amount of traffic as compared to other partitions). For example, if the workload changes suddenly and/or dramatically for a given partition, the system may be configured to react quickly to the change. In some embodiments, the partition splitting process described herein may be transparent to applications and clients/users, which may allow the data storage service to be scaled automatically (i.e. without requiring client/user intervention or initiation).

In some embodiments, each database partition 234 may be identified by a partition ID, which may be a unique number (e.g., a GUID) assigned at the time the partition is created. A partition 234 may also have a version number that is incremented each time the partition goes through a reconfiguration (e.g., in response to adding or removing replicas, but not necessarily in response to a master failover). When a partition is split, two new partitions may be created, each of which may have a respective new partition ID, and the original partition ID may no longer be used, in some embodiments. In some embodiments, a partition may be split by the system using a split tool or process in response to changing conditions.

Split or move events may be detected by storage node management 224 in various ways. For example, partition size and heat, where heat may be tracked by internally measured metrics (such as IOPS), externally measured metrics (such as latency), and/or other factors may be evaluated with respect to various performance thresholds.

System anomalies may also trigger split or move events (e.g., network partitions that disrupt communications between replicas of a partition in a replica group, in some embodiments. Storage node management 224 may detect storage node failures, or provide other anomaly control, in some embodiments. If the partition replica hosted on the storage node on which a fault or failure was detected was the master for its replica group, a new master may be elected for the replica group (e.g., from amongst remaining storage nodes in the replica group). Storage node management 224 may initiate creation of a replacement partition replica while the source partition replica is live (i.e. while one or more of the replicas of the partition continue to accept and service requests directed to the partition), in some embodiments. In various embodiments, the partition replica on the faulty storage node may be used as the source partition replica, or another replica for same partition (on a working machine) may be used as the source partition replica, e.g., depending type and/or severity of the detected fault.

Control plane 220 may implement table/index creation and management 222 to manage the creation (or deletion) of database tables and/or secondary indexes hosed in database service 210, in some embodiments. For example, a request to create a secondary index may be submitted via administrator console 226 (or other database service 210 interface) which may initiate performance of a workflow to generate appropriate system metadata (e.g., a table identifier that is unique with respect to all other tables in database service 210, secondary index performance or configuration parameters, and/or various other operations for creating a secondary index as discussed below). Backup management (not illustrated) may handle or manage backup requests to make copies as of a version or point-in-time of a database, as partition snapshots 242 and partition change log(s) 244 that together makeup partition backup(s) 241 in storage service 240 which may be used to perform an offline build of a replicated data set like a secondary index.

In some embodiments, database service 210 may also implement a plurality of storage nodes 230, each of which may manage one or more partitions of a database table or secondary index on behalf of clients/users or on behalf of database service 210 which may be stored in database storage 234 (on storage devices attached to storage nodes 230 or in network storage accessible to storage nodes 230).

Storage nodes 230 may implement item request processing 232, in some embodiments. Item request processing 232 may perform various operations (e.g., read/get, write/update/modify/change, insert/add, or delete/remove) to access individual items stored in tables in database service 210, in some embodiments. In some embodiments, item request processing 232 may support operations performed as part of a transaction, including techniques such as locking items in a transaction and/or ordering requests to operate on an item as part of transaction along with other requests according to timestamps (e.g., timestamp ordering) so that storage nodes 230 can accept or reject the transaction-related requests. In some embodiments, item request processing 232 may maintain database partitions 234 according to a database model (e.g., a non-relational, NoSQL, or other key-value database model).

In some embodiments, database service 210 may provide functionality for creating, accessing, and/or managing tables or secondary indexes at nodes within a multi-tenant environment. For example, database partitions 234 may store table item(s) from multiple tables, indexes, or other data stored on behalf of different clients, applications, users, accounts or non-related entities, in some embodiments.

In addition to dividing or otherwise distributing data (e.g., database tables) across storage nodes 230 in separate partitions, storage nodes 230 may also be used in multiple different arrangements for providing resiliency and/or durability of data as part of larger collections or groups of resources. A replica group, for example, may be composed of a number of storage nodes maintaining a replica of particular portion of data (e.g., a partition) for the database service 210. In some embodiments, a replica group may include a primary storage node which may act as, for instance, a read-write node, for the partition. As discussed in detail below with regard to FIG. 3, a primary storage node of a replica group may also be involved in the management of Moreover, different replica groups may utilize overlapping nodes, where a storage node 230 may be a member of multiple replica groups, maintaining replicas for each of those groups whose other storage node 230 members differ from the other replica groups.

Different models or formats for storing data for database tables in database service 210 may be implemented, in some embodiments. For example, in some embodiments, non-relational, NoSQL, semi-structured, or other key-value data formats may be implemented. In at least some embodiments, the data model may include tables containing items that have one or more attributes. In such embodiments, each table maintained on behalf of a client/user may include one or more items, and each item may include a collection of one or more attributes. The attributes of an item may be a collection of one or more key-value pairs, in any order, in some embodiments. In some embodiments, each attribute in an item may have a key, a type, and a value. In some embodiments, the items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s) and version attributes, in some embodiments. In some embodiments, the tables maintained by the database service 210 (and the underlying storage system) may have no pre-defined format other than their reliance on the primary key.

Metadata or other system data for tables may also be stored as part of database partitions using similar partitioning schemes and using similar indexes, in some embodiments.

Database service 210 may provide an application programming interface (API) for requesting various operations targeting tables, indexes, items, and/or attributes maintained on behalf of storage service clients. In some embodiments, the service (and/or the underlying system) may provide both control plane APIs and data plane APIs. The control plane APIs provided by database service 210 (and/or the underlying system) may be used to manipulate table-level entities, such as tables and indexes and/or to re-configure various tables These APIs may be called relatively infrequently (when compared to data plane APIs). In some embodiments, the control plane APIs provided by the service may be used to create tables or secondary indexes for tables at separate storage nodes, import tables, export tables, delete tables or secondary indexes, explore tables or secondary indexes (e.g., to generate various performance reports or skew reports), modify table configurations or operating parameter for tables or secondary indexes, and/or describe tables or secondary indexes, and create and/or associate functions with tables. In some embodiments, control plane APIs that perform updates to table-level entries may invoke asynchronous workflows to perform a requested operation. Methods that request "description" information (e.g., via a describeTables API) may simply return the current known state of the tables or secondary indexes maintained by the service on behalf of a client/user. The data plane APIs provided by database service 210 (and/or the underlying system) may be used to perform item-level operations, such as requests for individual items or for multiple items in one or more tables table, such as queries, batch operations, and/or scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

Database service 210 may include support for some or all of the following operations on data maintained in a table (or index) by the service on behalf of a storage service client: perform a transaction (inclusive of one or more operations on one or more items in one or more tables), put (or store) an item, get (or retrieve) one or more items having a specified primary key, delete an item, update the attributes in a single item, query for items using an index, and scan (e.g., list items) over the whole table, optionally filtering the items returned, or conditional variations on the operations described above that are atomically performed (e.g., conditional put, conditional get, conditional delete, conditional update, etc.). For example, the database service 210 (and/or underlying system) described herein may provide various data plane APIs for performing item-level operations, such as a TransactItems API, PutItem API, a GetItem (or GetItems) API, a DeleteItem API, and/or an UpdateItem API, as well as one or more index-based seek/traversal operations across multiple items in a table, such as a Query API and/or a Scan API.

Storage service 240 may be file, object-based, or other type of storage service that may be used to store partition snapshots 242 as backups 241. Storage service 240 may implement striping, sharding, or other data distribution techniques so that different portions of a partition backup 241 are stored across multiple locations (e.g., at separate nodes). In at least some embodiments, update logs 244 (e.g., created by updates for database partitions 234 by item request processing 232) may be stored as objects in storage service 240.

Figure 3:
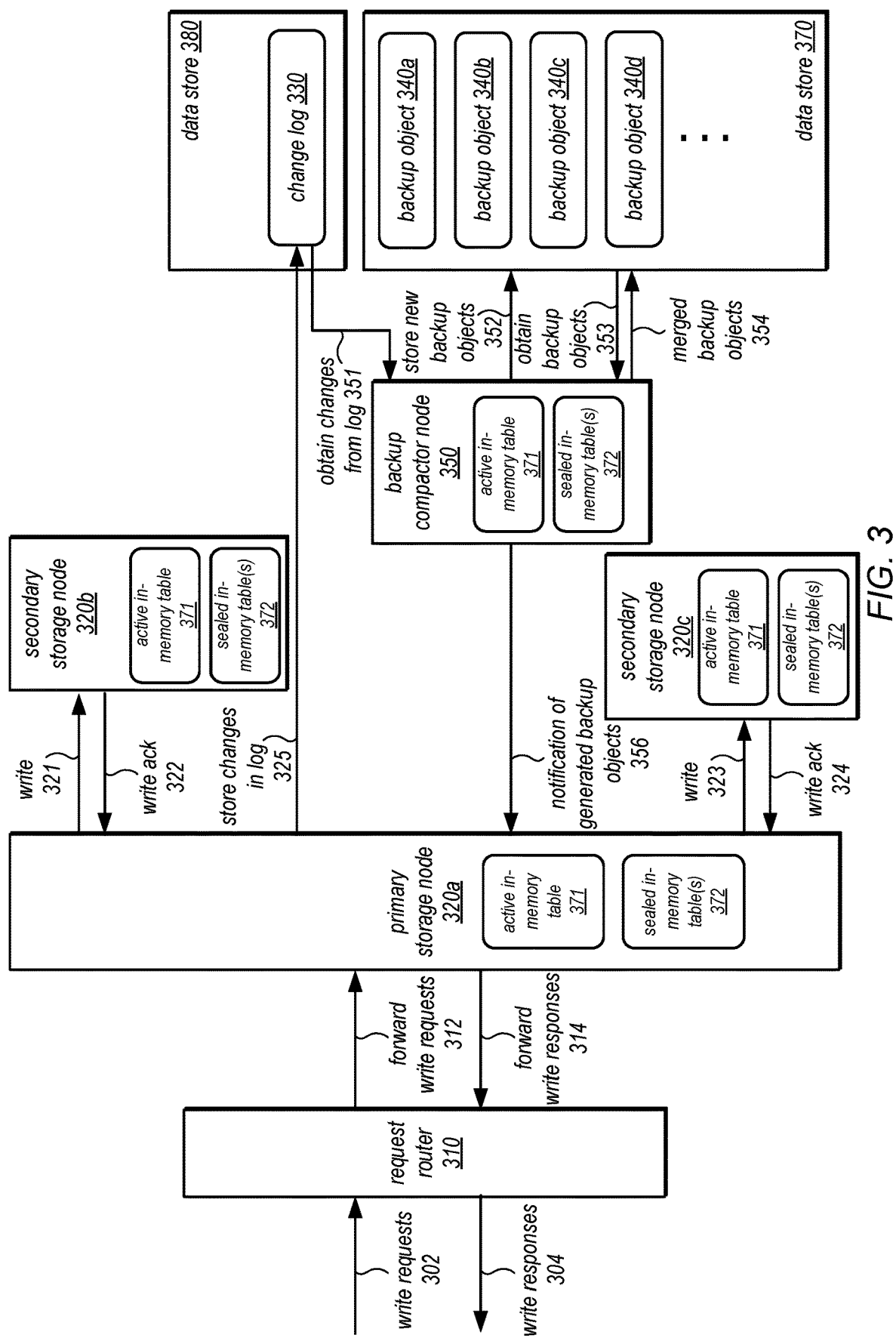
FIG. 3 is a logical block diagram illustrating interactions between storage nodes and backup compactor nodes, according to some embodiments.

FIG. 3 is a logical block diagram illustrating interactions between storage nodes and backup compactor nodes, according to some embodiments. Write requests 302 may be received at request router 310 and forwarded 312 to the appropriate primary storage node for the partition to which the write is directed. Primary storage nodes 320a may utilize a replication protocol to perform the write (e.g., by sending the write to secondary storage nodes 320b and 320c respectively, as indicated at 321 and 323). Acknowledgments, such as acks 322 and 324 may be returned to indicate to primary storage node 320a that the write completed successfully (e.g., to satisfy a quorum or other durability requirement). Primary storage node 320a may then forward a write response (or failure) as indicated at 314 to request router 310, which may return the write responses 304.

Primary storage node 320a may store changes in a change log 330 data store 380, as indicated at 325. For example, data store 380 may be an append only data store (e.g., a streaming data store). Primary storage node 320a may maintain an active in-memory table 371 and (if not determined to be flushed to data store 370) sealed in-memory table(s) 372. These active in-memory tables 371 and sealed in-memory table(s) 372 may be similar to those discussed above with regard to FIG. 1. Each secondary storage node 320b and 320c and backup compactor node 350 may maintain respective copies.

As discussed above with regard to FIG. 1, backup node compactor 350 may generate new data objects, sometimes referred to as backup objects, by obtaining 351 the changes from the change log 330. In some embodiments, the changes 351 may indicate a sealed in-memory table (as determined by primary storage node 320a according to a detected triggering event as discussed below), such as one of sealed in-memory tables 372. Backup compactor node 350 may then generate a new backup object corresponding to the sealed in-memory table 372 (as described in the change log), and store 352 the backup object as part of backup objects 340*a*, 340*b*, 340*c*, 340*d*, and so on, in storage service 240.

A notification of the backup object being stored may be returned, as indicated at 356 which may allow primary storage node 320*a* (and secondary storage nodes 320*b* and 320*c*) to discard the sealed in-memory table 372, freeing up memory. Moreover, notification 356 may indicate to primary storage node 320*a* (and secondary storage nodes 320*b* and 320*c*) that the backup object can be obtained from storage service 370 (if desirable). Backup compactor node 350 may also compact backup objects according to the techniques discussed below with regard to FIG. 4, by obtaining backup objects 353 and storing merged backup objects 354.

Figure 4:
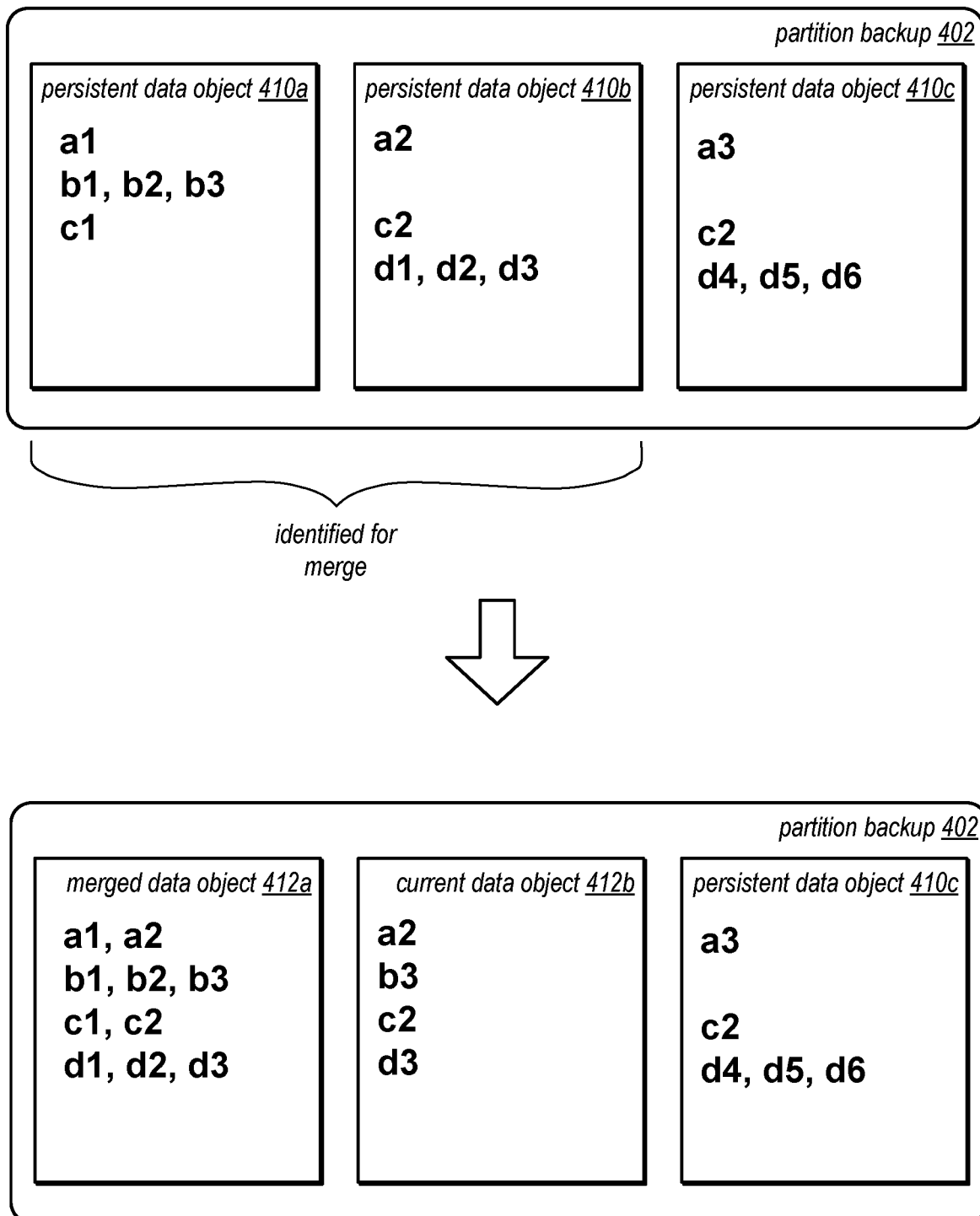
FIG. 4 is a logical block diagram illustrating compaction of backup blocks that sort items according to value and time, according to some embodiments.

FIG. 4 is a logical block diagram illustrating compaction of backup blocks that sort items according to value and time, according to some embodiments. Partition backup 402 may be a collection of persistent data objects 410*a*, 410*b*, and 410*c*, stored as discussed above with regard to data object 140. Each data object 410 may store the different versions of items, sorted according to time and key (e.g., key "b" is sorted according to time of "b1" then "b2" and then "b3" in persistent data object 410*a*). Moreover, each persistent data object 410 may correspond to a different range of time (e.g., no updates in the range of time for persistent data object 410*b* were received for key "b"). Thus, persistent data objects may store keys within the entire space of a partition, but may have a specific range of time that includes the oldest and newest updates described therein.

Two (or more) data objects 410 may be identified for merge, such as data objects 410*a* and 410*b*. Various techniques may be used to identify persistent data objects for merge. For example, one technique may be leveled compaction. Each persistent data object in this technique would be associated with a level. A persistent data object that is newly flushed from an in-memory table would have a level=0. Every time a persistent data object is compacted (and thus merged with another persistent data object), its level would increment by 1. A level's compaction could be triggered once the number of data objects on that level reaches X (e.g., 2). Thus, in the illustrated example in FIG. 4, both persistent data object data objects 410*a* and 410*b* would be 2 objects at level=1, and so both would be compacted and merged, with merged data object 412*a* having a level=2. In this way, compaction may continue to merge persistent data objects over time. Consider an example configuration, where level-0 is a sealed memtable, level-1 is two 64 MB files, level-1 is two 128 MB files, level-3 is two 256 MB files, level-4 is two 512 MB files, and so on. In some embodiments, compaction may merge all persistent data objects into a single persistent data object.

Compaction techniques may create two data objects to replace the merged data objects, a merged data object 412*a*, which may store the items in both data objects, sorted according to value and time, while not retaining any items whose time value is not within a retention threshold (e.g., 30 days). In this way, the partition backup 402 may still preserve the ability to do point in time or other restores within the retention threshold. The merged data object 412*a* may include a similar structure to that discussed above with regard to FIG. 1, including a new root page, encode page, metadata page, index pages, and data pages. Current data object 412*b* may store those item key values that are the latest according to time in the merged data objects.

Figure 5:
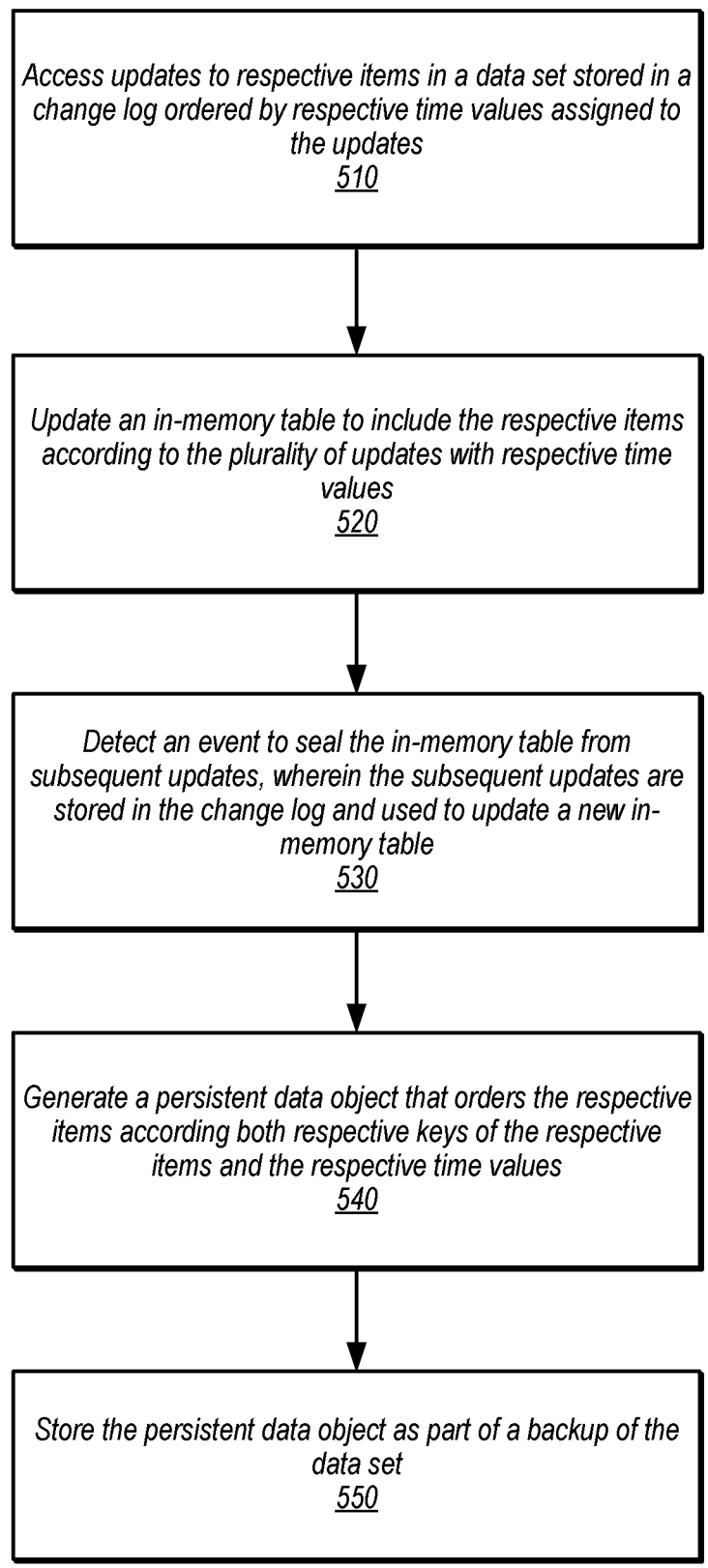
FIG. 5 is a high-level flowchart illustrating various methods and techniques to implement time and value ordered data objects for a backup of a data set, according to some embodiments.

The examples of a database that implements implement time and value ordered data objects for a backup of a data set as discussed in FIGS. 2-4 above have been given in regard to a database service (e.g., a relational database, a document database, a non-relational database, etc.). However, various other types of database systems or storage systems can advantageously implement time and value ordered data objects for a backup of a data set, in other embodiments. FIG. 5 is a high-level flowchart illustrating various methods and techniques to implement time and value ordered data objects for a backup of a data set, according to some embodiments. These techniques, as well as the techniques discussed with regard to FIGS. 6, may be implemented using components or systems as described above with regard to FIGS. 2-4, as well as other types of databases or storage systems, and thus the following discussion is not intended to be limiting as to the other types of systems that may implement the described techniques.

As indicated at 510, updates to respective items in a data set stored in a change log ordered by respective time values assigned to the updates may be accessed, in some embodiments. For example, as discussed above with regard to FIG. 1, a change log may store updates that correspond to different values of a key-value pair for the items. Each time value may be, for instance a timestamp, sequence number of other indication of time relative to other changes.

As indicated at 520, an in-memory table may be updated to include the respective items according to the plurality of updates with respective time values, according to some embodiments. For example, the change log may be persistent may be used to ensure that a change, once committed to the data set, is persistent in the event of failure, whereas the in-memory table (e.g., an active in-memory table 120 in FIG. 1), may be in ephemeral or volatile storage that may lose contents when, for example, a power or application failure occurs. The in-memory table may be used to answer access requests (e.g., to read items in the data set) without having to access a persistent copy of the data set.

As indicated at 530, an event to seal the in-memory table from subsequent updates, wherein the subsequent updates are stored in the change log and used to update a new in-memory table may be detected, according to some embodiments. Different events may cause sealing of the in-memory table in some embodiments. For example, a size threshold (e.g., 64 MB) may be applied to the amount of memory (e.g., size) of the in-memory table, so that sealing may occur when the size threshold is exceeded. In some embodiments, a number of items in the in-memory table may be compared with an item threshold, so that sealing may occur when the item threshold is exceeded. In some embodiments, event thresholds or other criteria may be dynamic in order to respond to changing conditions. For example, the in-memory table may be maintained at a storage node (as discussed above with regard to FIG. 3) or another database engine, data processing engine, or data access component. If the workload (e.g., number and/or complexity of requests) causes an increased need for memory to hold, for instance, temporary results, connection state, or various other information, this memory pressure may lower the size or item thresholds, causing sealing to occur more quickly. As discussed above with regard to FIG. 3, in some embodiments, a remote component (e.g. a backup compaction node may perform persistent data object storage) thus an indication or notification of a sealed in-memory table may be provided (e.g., as a message or indication sent directly to the remote component, or, as discussed above, a record, change or other indication included in the change log (which may also describe system operations) that can be read or obtained by that remote component). In some embodiments, a single component (e.g., storage node, database engine, or other data processing component that provides access to a data set) may perform each of the features described in FIG. 5.

As indicated at 540, a persistent data object that orders the respective items according both respective values of the respective items and the respective time values may be generated, according to some embodiments. For example, the file format illustrated in FIG. 1, may be created where a root page, metadata page, encoding page, index pages, and data pages may be created. As discussed above compression techniques may be performed to encode the pages in the persistent data object and, in some embodiments, different compression techniques may be applied to different pages as appropriate (e.g., an optimal compression technique may be identified for each page and the optimal compression technique may different from page to page). Similarly, encryption techniques may be performed to encode the pages in the persistent data object. Like compression, different encryption techniques could be applied to different pages, in some embodiments, whereas in other embodiments a common encryption technique could be applied to the pages (e.g., except for a root page and/or encoding page which may hold the encryption key (wrapped in encryption using a different encryption key obtained elsewhere) to decrypt pages)).

As indicated at 550, the persistent data object may be stored as part of a backup of the data set, according to some embodiments. For example, a collection persistent data objects may be maintained as part of a backup in order to support various restore operations, such as restores in the event of failure or restores to provide access to the data at a prior point in time. The collection of persistent data objects may together provide access to all versions of items in the data set (e.g., including prior to deletion) for access. In at least some embodiments, the collection of persistent data objects may be for a specific partition of the data set. In at least some embodiments, the collection of persistent data objects may be a log structured merge (LSM) tree.

Figure 6:
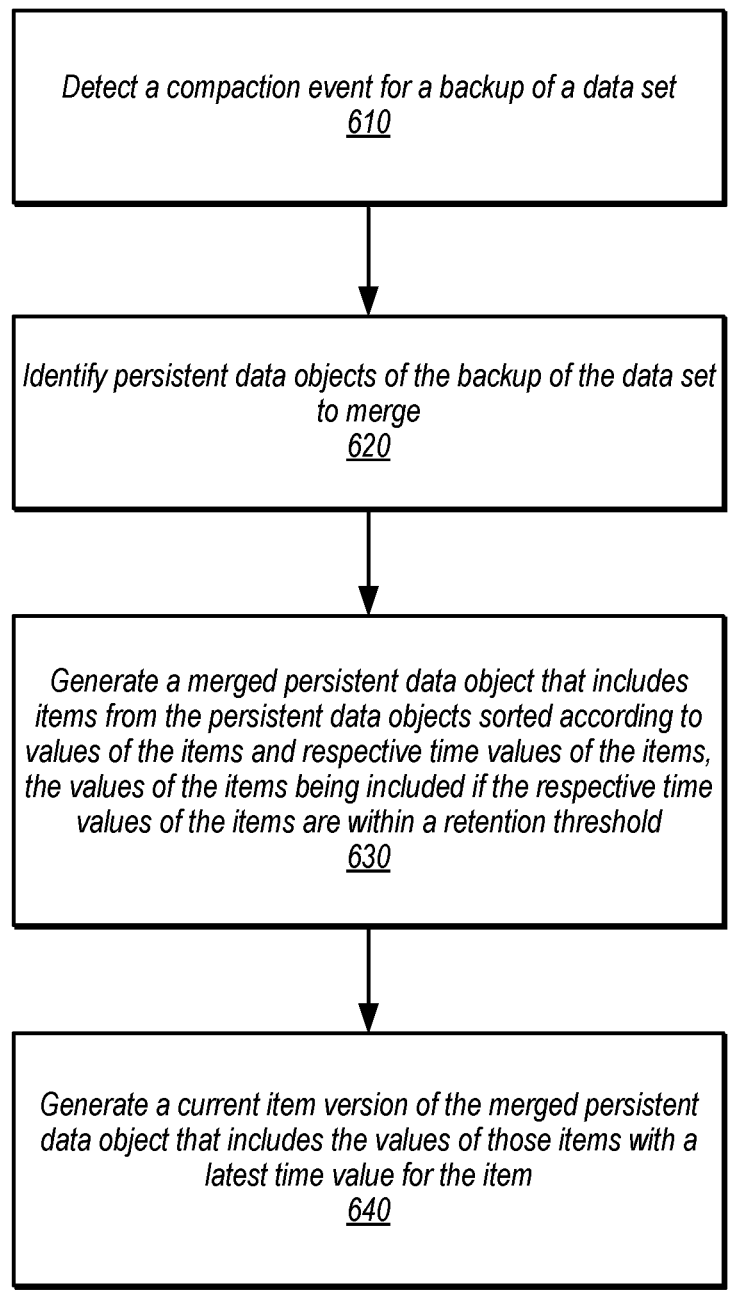
FIG. 6 is a high-level flowchart illustrating various methods and techniques to implement compacting time and value ordered data objects for a backup of a data set, according to some embodiments.

FIG. 6 is a high-level flowchart illustrating various methods and techniques to implement compacting time and value ordered data objects for a backup of a data set, according to some embodiments. As indicated at 610, a compaction event for a backup of a data asset may be detected, according to some embodiments. As discussed in detail above, compaction events may be detected in various ways, such as based on the number of persistent data objects (e.g., at a particular size or level). Compaction events may be detected based on availability of resources to perform compaction (e.g., as a background process that does interfere with client application workloads (e.g., requests). Compaction events may occur periodically (e.g., every hour), in some embodiments. In some embodiments, compaction may be requested (e.g., by another component monitoring backup storage utilization in order to induce more efficient read performance or reduce storage utilization).

As indicated at 620, persistent data objects of the backup of the data set to merge may be identified, according to some embodiments. For example, an oldest two persistent data objects (e.g., on a level or overall) may be identified. In another example, the smallest two persistent data objects may be identified. In some embodiments, all persistent data objects (e.g., two or more) may be identified for merge. In some embodiments, persistent data objects identified for merge may have adjacent ranges of time so that when merged no other persistent data object also stores items with respective time values in the merged object's range of time. For instance, if object A is $T_1$ to $T_{10}$ and object B is $T_{11}$ to $T_{20}$ and object C is $T_{21}$ through $T_{30}$, then A and C would not be identified for merge without also identifying B, but A and B could be identified without C, or B and C could be identified without A.

As indicated 630, a merged persistent data object that includes items from the persistent data objects sorted according to values of the items and respective time values of the items, the values of the items being included if the respective time values of the items are within a retention threshold, according to some embodiments. Similar to the generation of a persistent data object as discussed above with regard to FIGS. 1, 3, 4, and 5, the example file format may be used, including root page, metadata page, encoding page, index pages and data pages. Changes to encoding, including different compaction or encryption (or if none were previously applied) may be made in some embodiments, but not in other embodiments.

As indicated at 640, a current item version of the merged persistent data object that includes the values of those items with a latest time value for the item may be generated, according to some embodiments. In this way, current item version persistent data object can be read first to check for a most current value of an item without having to read the merged persistent data object, in some scenarios.

The methods described herein may in various embodiments be implemented by any combination of hardware and software. For example, in some embodiments, the methods may be implemented by a computer system (e.g., a computer system as in FIG. 7) that includes one or more processors executing program instructions stored on a computer-readable storage medium coupled to the processors. The program instructions may implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 7:
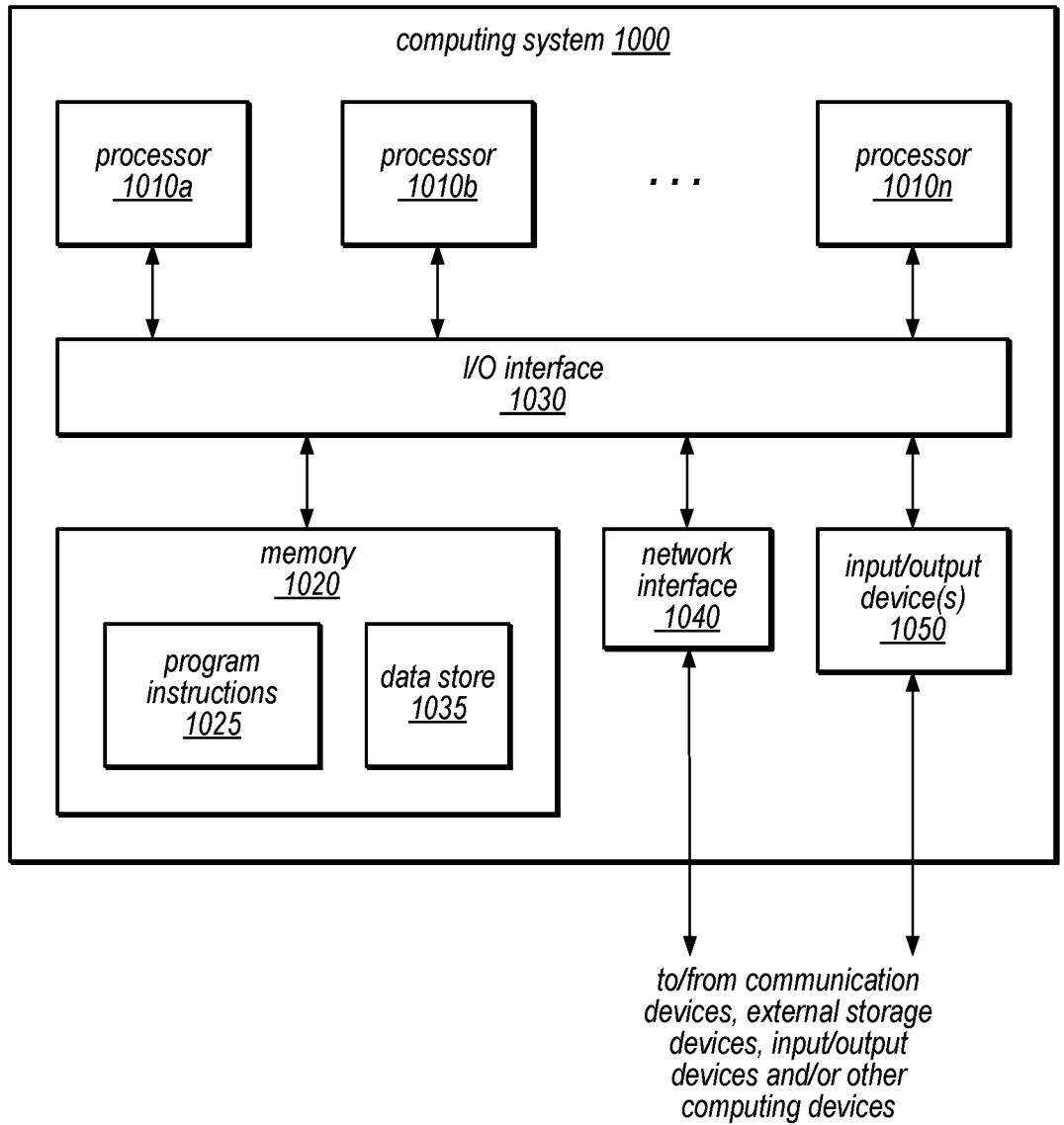
FIG. 7 is a block diagram illustrating an example computing system, according to some embodiments.

Embodiments to implement time and value ordered data objects for a backup of a data set as described herein may be executed on one or more computer systems, which may interact with various other devices. One such computer system is illustrated by FIG. 7. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or compute node, computing device or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device, keyboard, and display(s). Display(s) may include standard computer monitor(s) and/or other display systems, technologies or devices, in some embodiments. In some embodiments, it is contemplated that embodiments may be implemented using a single instance of computer system 1000, while in other embodiments multiple such systems, or multiple nodes making up computer system 1000, may host different portions or instances of embodiments. For example, in some embodiments some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions, in some embodiments. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device, in some embodiments. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in some embodiments.

System memory 1020 may store program instructions 1025 and/or data accessible by processor 1010 to implement associating a function with a table in a database system, in some embodiments. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above to perform offline builds for projected data subsets are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. A computer-accessible medium may include non-transitory storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040, in some embodiments.

In some embodiments, I/O interface 1030 may be coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000, in some embodiments. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000, in some embodiments. Multiple input/output devices 1050 may be present in computer system 1000 or may be distributed on various nodes of computer system 1000, in some embodiments. In some embodiments, similar input/output devices may be separate from computer system 1000 and may interact with one or more nodes of computer system 1000 through a wired or wireless connection, such as over network interface 1040.

As shown in FIG. 7, memory 1020 may include program instructions 1025, that implement the various embodiments of the systems as described herein, and data store 1035, comprising various data accessible by program instructions 1025, in some embodiments. In some embodiments, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1000 may be transmitted to computer system 1000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one processor; and
   a memory, storing program instructions that when executed by the at least one processor, cause the at least one processor to implement a database system, the database system configured to:
   detect a compaction event for a backup of a data set;
   identify persistent data objects of the backup of the data set to merge;
   generate a merged persistent data object that includes items from the persistent data objects sorted according to values of the items and respective time values of the items, the values of the items being included if the respective time values of the items are within a retention threshold; and
   generate a current item version of the merged persistent data object that includes the values of those items with a latest time value for the item.

2. The system of claim 1, wherein the detection of the compaction event is based, at least in part, on availability of computing resources to perform compaction.

3. The system of claim 1, wherein the detection of the compaction event is based, at least in part, on a number of the persistent data objects.

4. The system of claim 1, wherein the detection of the compaction event is based, at least in part, on a periodic occurrence of time.

5. The system of claim 1, wherein the detection of the compaction event is based, at least in part, on a request received from a component monitoring backup storage utilization in order to induce more efficient read performance or reduce storage utilization.

6. The system of claim 1, wherein to generate the merged persistent data object, the database system is configured to encrypt data of the merged persistent data object.

7. The system of claim 1, wherein to generate the merged persistent data object, the database system is configured to compress data of the merged persistent data object.

8. A method, comprising:
   detecting a compaction event for a backup of a data set;
   identifying persistent data objects of the backup of the data set to merge;
   generating a merged persistent data object that includes items from the persistent data objects sorted according to values of the items and respective time values of the items, the values of the items being included if the respective time values of the items are within a retention threshold; and
   generating a current item version of the merged persistent data object that includes the values of those items with a latest time value for the item.

9. The method of claim 8, wherein the detection of the compaction event is based, at least in part, on availability of computing resources to perform compaction.

10. The method of claim 8, wherein the detection of the compaction event is based, at least in part, on a number of the persistent data objects.

11. The method of claim 8, wherein the detection of the compaction event is based, at least in part, on a periodic occurrence of time.

12. The method of claim 8, wherein the detection of the compaction event is based, at least in part, on a request received from a component monitoring backup storage utilization in order to induce more efficient read performance or reduce storage utilization.

13. The method of claim 8, wherein generating the merged persistent data object comprises encrypting data of the merged persistent data object.

14. The method of claim 8, wherein generating the merged persistent data object comprises compressing data of the merged persistent data object.

15. One or more non-transitory computer-readable storage media storing program instructions that, when executed on or across one or more computing devices, cause the one or more computing devices to implement:
   detecting a compaction event for a backup of a data set;
   identifying persistent data objects of the backup of the data set to merge;

generating a merged persistent data object that includes items from the persistent data objects sorted according to values of the items and respective time values of the items, the values of the items being included if the respective time values of the items are within a retention threshold; and generating a current item version of the merged persistent data object that includes the values of those items with a latest time value for the item.

16. The one or more non-transitory computer-readable storage media of claim 15, wherein the detection of the compaction event is based, at least in part, on a number of the persistent data objects.

17. The one or more non-transitory computer-readable storage media of claim 15, wherein the detection of the compaction event is based, at least in part, on a number of the persistent data objects.

18. The one or more non-transitory computer-readable storage media of claim 15, wherein the detection of the compaction event is based, at least in part, on a request received from a component monitoring backup storage utilization in order to induce more efficient read performance or reduce storage utilization.

19. The one or more non-transitory computer-readable storage media of claim 15, wherein, in generating the merged persistent data object, the program instructions cause the one or more computing devices to implement encrypting data of the merged persistent data object.

20. The one or more non-transitory computer-readable storage media of claim 15, wherein, in generating the merged persistent data object,, the program instructions cause the one or more computing devices to implement compressing data of the merged persistent data object.

* * * * *